(12) United States Patent
Kemnitzer et al.

(10) Patent No.: US 6,359,102 B1
(45) Date of Patent: Mar. 19, 2002

(54) BIPHASIC POLYMERIZATION PROCESS

(75) Inventors: John E. Kemnitzer, Plainsboro; George L. Brode, Bridgewater; Joachim B. Kohn, Highland Park, all of NJ (US)

(73) Assignee: Integra LifeSciences I, Ltd., Plainsboro, NJ (US)

( * ) Notice: Subject to any disclaimer, the term of this patent is extended or adjusted under 35 U.S.C. 154(b) by 0 days.

(21) Appl. No.: 09/107,753

(22) Filed: Jun. 29, 1998

Related U.S. Application Data

(63) Continuation-in-part of application No. 08/884,108, filed on Jun. 27, 1997, now abandoned.

(51) Int. Cl.⁷ .................. C08G 64/24; C08G 63/79; C08G 64/12; C08G 63/685
(52) U.S. Cl. .................. 528/179; 525/183; 525/184; 525/196; 525/199; 525/210; 525/288; 525/332; 525/368; 525/371; 525/422
(58) Field of Search ............ 528/174, 176, 528/203, 204, 179, 183, 184, 196, 199, 210, 288, 332, 368, 371, 422

(56) References Cited

U.S. PATENT DOCUMENTS

| | | | | |
|---|---|---|---|---|
| 4,286,083 A | * | 8/1981 | Kochanowski et al. | 528/173 |
| 4,835,248 A | * | 5/1989 | Bader et al. | 528/328 |
| 4,980,449 A | | 12/1990 | Kohn et al. | 528/211 |
| 5,043,203 A | * | 8/1991 | Fyvie et al. | 528/198 |
| 5,099,060 A | | 3/1992 | Kohn et al. | 560/40 |
| 5,140,094 A | | 8/1992 | Kohn et al. | 528/211 |
| 5,194,570 A | | 3/1993 | Kohn et al. | 528/211 |
| 5,198,507 A | | 3/1993 | Kohn et al. | 525/432 |
| 5,416,185 A | | 5/1995 | Becraft et al. | 528/196 |
| 5,587,507 A | | 12/1996 | Kohn et al. | 560/40 |

FOREIGN PATENT DOCUMENTS

| | | |
|---|---|---|
| WO | 9630331 | 10/1996 |

OTHER PUBLICATIONS

Riffle et al., Org. Coat. Plast. Chem. (1980), 42, 122–6.*
Keohan et al., J. Polym. Sci., Polym. Chem. Ed. 22(3), p 679–704, 1984.*

* cited by examiner

*Primary Examiner*—Jeffrey C. Mullis
(74) *Attorney, Agent, or Firm*—Caesar, Rivise, Bernstein, Cohen & Pokotilow, Ltd.

(57) ABSTRACT

Improvements are disclosed for biphasic polymerization processes in which an aqueous solution of a first monomer that is hydrolytically unstable below a pH of about six or above a pH of about eight is admixed with a water-immiscible organic solvent and there is added to the admixture a catalyst selected from tertiary amine, quaternary amine and phosphonium catalysts, an acid-forming co-monomer for the first monomer, an acid scavenger, after which the resulting polymer is recovered, wherein the improvement includes providing the aqueous solution at a pH between about si and about eight, and adding to the admixture the acid-forming co-monomer and the acid scavenger at relative rates effective to maintain the pH of the admixture between about six and about eight. The catalyst may be added in a molar ratio to the first monomer effective to provide a predetermined weight-average or number-average molecular weight for the resulting polymer. Biphasic polymerization processes for monomers that are not pH sensitive are also disclosed.

45 Claims, 1 Drawing Sheet

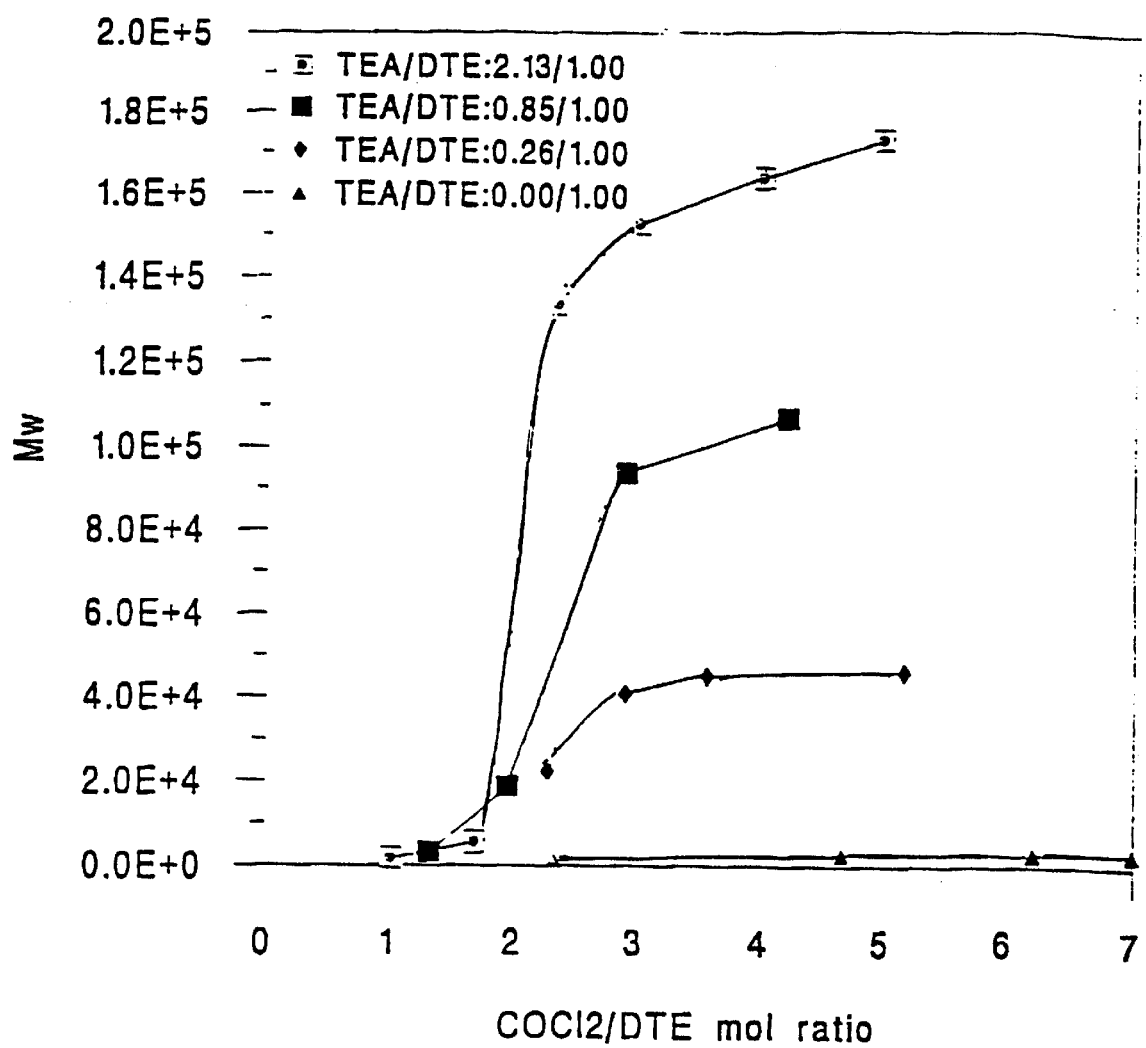
Fig. 1    Effect of TEA on DTE Interfacial Polymerization

BIPHASIC POLYMERIZATION PROCESS

RELATED APPLICATION

The present application is a continuation-in-part of U.S. patent application Ser. No. 08/884,108, filed Jun. 27, 1997 now abandoned, the contents of which are hereby incorporated by reference.

FIELD OF THE INVENTION

The present invention relates generally to biphasic processes for the polymerization of polymers and more particularly concerns such polymerization processes using pH-sensitive monomers.

BACKGROUND ART

The biphasic polymerization of bisphenols with phosgene is a common method for the preparation of polycarbonates. Generally, polycarbonate preparation involves the phosgenation of an aqueous alkaline solution of the bisphenol in the presence of an inert organic solvent and typically an amine catalyst. The pH can be quite high (>12) when an excess amount of alkaline base is used, or may be controlled between pH 8–10. The pH in all of these cases is used to control the final optical (i.e., color) properties of the material. In all cases, the bisphenol is extremely hydrolytically stable over the entire pH range and molecular weight control is usually achieved by the use of monofunctional end-capping reagents.

U.S. Pat. No. 5,416,185 to Becraft and Ramsey concerns a conventional process for preparation of polycarbonates. In particular, the patent disclosed a method for producing polycarbonates by an interfacial reaction of phosgene and bisphenol in a two-phase reaction medium containing an aqueous hydroxide and an organic solvent such as methylene chloride. According to the patent, phosgene usage in excess of about 15 mole percent above stoichiometrically predicted amounts was eliminated by controlling the pH of the medium to range between 8 and 10 and controlling the amount of water in the reaction medium so that high salt conditions were reached at the end of the phosgenation. A bisphenol specifically exemplified in the patent, bisphenol-A, is hydrolytically stable at high pH.

U.S. Pat. No. 5,198,507 discloses bioerodible polycarbonates prepared from amino acid-derived diphenols disclosed in U.S. Pat. No. 5,099,060. The disclosures of both the '507 patent and the '060 pagent are incorporated herein by reference. A particularly useful diphenol monomer disclosed in U.S. Pat. No. 5,099,060 is desaminotyrosyl tyrosine ethyl ester (DTE).

DTE is an extremely pH-sensitive bisphenolic monomer. Attempts to polymerize this bisphenolic monomer with phosgene via a classical biphasic polymerization process resulted in severe monomer hydrolysis, and consequently a failure to synthesize the desired poly(DTE carbonate). This problem exists in general with the diphenol monomers disclosed in U.S. Pat. No. 5,099,060. A need exists for a biphasic process that is suitable for use with pH-sensitive monomers to synthesize polycarbonates, polyesters, polyamides and other polymers that may be prepared by biphasic methods.

SUMMARY OF THE INVENTION

It has now been discovered that strict pH control can be applied to biphasic processes, so that pH-sensitive monomers can be polymerzed to form a wide variety of useful polymeric products.

Therefore, according to one aspect of the present invention, in a biphasic polymerization process including the steps of:

admixing an aqueous solution of a first monomer, the first monomer being hydrolytically unstable below a pH of about six or above a pH of about eight, with a water-immiscible organic solvent;

adding to the admixture a catalyst selected from the group consisting of tertiary amine, quaternary amine and phosphonium catalysts, an acid-forming co-monomer for the first monomer and an acid scavenger; and recovering the resting polymer, the improvement includes providing the aqueous solution at a pH between about six and about eight; and adding to the admixture the acid-forming co-monomer and the acid scavenger at relative rates effective to maintain the pH of the admixture in a range from about six to less than eight.

According to another aspect of the present invention, in a biphasic polymerization process including the steps of:

admixing an aqueous solution of a first monomer, the first monomer being hydrolytically unstable below a pH of about six or above a pH of about eight, with a water-immiscible organic solvent;

adding to the admixture a catalyst selected form the group consisting of tertiary amine, quaternary amine and phosphonium catalysts, an acid-forming co-monomer for the first monomer and an acid scavenger; and recovering the resulting polymer, the improvement includes providing the aqueous solution at a pH between about six and about eight; and adding to the admixture the acid-forming co-monomer and the acid scavenger at relative rates effective to maintain the pH of the admixture between about six and about nine, the molar ratio of acid-forming co-monomer to first monomer being 1.4:1 or greater.

The biphasic polymerization process of the present invention is particularly useful for the polymerization of hydrolytically unstable diols, especially diphenols. For bisphenols, the co-monomer is typically a dihalide selected from:

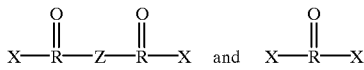

wherein X is a halogen, R is carbon or sulfur and Z is an aryl, alkyl, alkylaryl, alkyl ether, aryl ether or alkylaryl ether group containing up to 18 carbon atoms. When the pH-sensitive monomer is a diphenol and the dihalide is phosgene, the resulting polymer is a polycarbonate.

The present invention incorporates the unexpected discovery that the preferred narrow six to eight pH range also permits catalyst control of the final weight average molecular weight. In particular, it has been discovered that a roughly linear relations exists between weight-average and number-average polymer molecular weight and the molar ratio of amine catalysts to first monomers. Because the relationship is roughly linear, it is possible to use catalyst and first monomer concentrations to control polymer molecular weight without undue experimentation.

While not being bound by any particular theory, it is believed that the preferred pH range between about six and about eight permits catalyst control of polymer molecular weight because at specified molar ratios of catalyst to first monomer within this pH range, the catalyst becomes deactivated in the course of the reaction. The extent of the polymerization, and consequently the polymer molecular weight, is thereby controlled by the amount of catalyst relative to the first monomer. Above a pH of about eight, the catalyst is regenerated, and the amount of catalyst cannot as a practical matter be used to control the final polymer molecular weight.

The present invention thus provides a method to control the final weight-average or number-average molecular weights of biphasicly prepared polymers in general, without the use of end-capping reagents, and without controlling reactant stoichiometry. Thus, according to another aspect of the present invention in a biphasic polymerization process including the steps of:

admixing an aqueous solution of a first monomer with a water-immiscible organic solvent;

adding to the admixture a catalyst selected from the group consisting of tertiary anine, quaternary amine and phosphonium catalysts, an acid-forming co-monomer for the first monomer, and an acid scavenger; and recovering the resulting polymer;

the improvement includes providing the aqueous solution at a pH between about six and about eight, adding the amine catalyst to the admixture at a molar ratio to the first monomer effective to provide a predetermined weight-average or number-average molecular weight for the resulting polymer, and adding to the admixture the acid-forming co-monomer and the acid scavenger at relative rates effective to maintain the pH of the admixture in a range from about six to less than eight.

The ability to use amine catalyst concentration and strict pH control to determine final polymer molecular weight applies to biphasic polymerization monomers in general, and to both monomers that are hydrolytically unstable and monomers that are hydrolytically stable. A biphasic process is provided that makes possible the polymerization of end-functionalized polymers that may be further derivatized.

Other features of the present invention will be pointed out in the following description and claims, which disclose the principles of the invention and the best modes which are presently contemplated for carrying them out.

BRIEF DESCRIPTION OF THE DRAWINGS

A more complete appreciation of the invention and many more other intended advantages can be readily obtained by reference to the detailed description of the invention when considered in connection with FIG. 1, which depicts the inter-relationship between weight-average polymer molecular weight and the molar ratio of catalyst to monomer according to a polymerization process in accordance with the present invention. This figure also illustrates that the molar ratio of phosgene to monomer for polycarbonates has no effect on polymer molecular weight above 3:1 phosgene-monomer ratios.

DETAILED DESCRIPTION OF THE PREFERRED EMBODIMENT

Biphasic polymerization according to one aspect of the present invention admixes an aqueous solution of a first monomer that is hydrolytically unstable below a pH of about six or above a pH of about eight, with a water-immiscible organic solvent. Typically, the monomer, water and organic solvent are added slowly together with vigorous stirring. The reaction mixture is cooled, preferably to about 0° C. and the catalyst is then added. While the aqueous monomer solution should have a pH between about six and about eight before being contacted with the solvent, this is ordinarily the situation, and the pH typically does not fall below this range until after the acid-forming co-monomer is added to the reaction mixture.

The temperature is maintained between about 0° C. and about 15° C., and preferably between about 0C and about 5° C., while an acid-forming co-monomer for the first monomer is added to the reaction mixture. As the acid-forming co-monomer reacts with the first monomer, the pH of the reaction mixture drops. An acid scavenger, typically a caustic material, is added to maintain the pH between about six and about nine, preferably between about six and about eight, and most preferably at about seven. The addition rates of the acid-forming co-monomer and the acid scavenger are carefully controlled to maintain the pH balance.

The biphasic mixture is vigorously agitated and the two phases are intimately admixed in this manner to bring the first monomer, co-monomer and catalyst into reactive contact. The vigorous agitation is performed by mechanical means or other conventional liquid-liquid contacting techniques.

The ratio of the first monomer to the aqueous phase is not critical, although a slight weight excess, typically about 120 weight percent is preferred. The ratio of acid-forming co-monomer, in the case of phosgene, to the first monomer is preferably between about 1:1 and about 3:1 and more preferably between about 1.4:1 and about 3:1.

The organic solvents for the water-immiscible organic phase include chlorinated solvents such as methylene chloride, chloroform, 1,2-dichloroethane, and the like. The preferred water-immiscible organic solvent is methylene chloride. Preferably, the solvent is capable of dissolving the resulting polymer. Such solvents are readily identified by those of ordinary skill in the art without undue experimentation and include the aforementioned methylene chloride. The quantity of water-immiscible organic solvent is selected so that the amount of first monomer relative to the organic solvent ranges from about 10 to about 20 weight/volume percent, and preferably about 15 weight/volume percent.

The acid scavenger is typically a conventional organic or inorganic base. Inorganic bases such as an alkali or alkaline earth metal hydroxide, an alkali or alkaline earth metal carbonate, or an alkali or alkaline earth metal bicarbonate are suitable, with alkali metal hydroxides and carbonates being preferred. Potassium carbonate and sodium hydroxide, respectively, are more preferred, and sodium hydroxide is most preferred. Lewis bases may also be used. Typically between about a 0.5 N and about a 10.0 N concentration of the acid scavenger is added to reaction mixture to maintain the pH between about six and about eight. An acid scavenger concentration of about 1.0 N is preferred.

Catalysts for biphasic polymerization processes are well known and essentially conventional and include phase transfer catalysts. The catalyst is present at a molar ratio with respect to the first monomer between about 0.01:1 and about 2.13:1.

Well-known tertiary anine, quaternary amine and phosphonium catalysts are employed because these materials have been discovered to provide control over final polymer molecular weight when the biphasic polymerization reaction is performed within a preferred narrow pH range between about six and about eight. Tertiary amine and quaternary amine catalysts are preferred. The preferred catalysts include those typically used in biphasic polymerizations such as triethylamine, ADOGEN® 464 (a methyl $C_8$–$C_{10}$ trialkyl ammonium chloride), tetrabutyl ammonium iodide, benzyltriethylammonium chloride and pyridine. Triethylamine, ADOGEN® 464 and tetrabutyl ammonium iodide are more preferred, and triethylamine is particularly preferred.

Other suitable phase transfer catalysts include: tetraethylammonium chloride monohydrate, tetraethylammonium bromide, tetraethylammonium iodide, tetraethylammonium tetratluoroborate, tetraethylammonium p-toluenesulphonate, tetraethylammonium hydroxide, allyl triethylammonium bromide, n-Hexyl trimethylammonium bromide, phenyl trimethylammonium chloride, phenyl trimethylammonium iodide, benzyl trimethylammonium bromide, benzyl trimethylammonium iodide, nctyl trimethylanunonium bromide, tetra-n-propylammonium bromide, tetra-n-propylammonium hydrogen sulphate, tetra-n-propylammonium trifluoromethanesulphonate, benzyl triethylammonium bromide, benzyl triethylammonium tetrafuoroborate, ndodecyl trimeihylammonium bromide, tetra-n-butylammonium chloride, tetra-n-butylammonium bromide, tetra-n-butylamn hydrogen sulphate, tetra-n-butylammonium hydroxide, tetra-n-butylammonium trifluoromethanesulphonate, n-hexadecyl trimethylammonium bromide, benzyl tri-n-propylammonium chloride, benzyl tri-n-butylammonium chloride, benzyl tri-n-butylammonim bromide, tetra-n-butylphosphonium bromide, tetraphenylphosphonium chloride, tetraphenylphosphonium bromide, tetraphenylphosphonium iodide, tetraphenylphosphoniumhexafluoroantimonate, tetraphenylphosphonium tetrafluoroborate, n-hexadecyl pyridinium chloride monohydrate, n-hexadecylpyridinium bromide, tetra-n-hexylanunonium bromide, tetra-n-hexylammonium hydrogen sulphate, n-hexadecyl tri-n-butylphosphonium bromide, triphenylmethyl triphenylphosphonium chloride, tetra-n-octyl-ammonium bromide and tetra-n-dodecylammonium iodide.

Within the pH range of about six to about eight, there is a roughly linear relationship between catalyst concentration and the final weight-average or number-average molecular weight of the polymer. The accompanying figure depicts the biphasic polymerization of poly(DTE carbonate) from DTE and phosgene. From the accompanying drawing figure, for any desired molecular weight of poly(DTE carbonate), it is possible to select the molar ratio of triethylamine to DTE that will produce poly(DTE carbonate) with the preselected molecular weight.

Because of the polymerization principles involved, one of ordinary skill in the art would expect this linear relationship to extend to essentially any monomer which undergoes biphasic polymerization. Because the relationship is linear, one of ordinary skill in the art can generate a graph for essentially any tertiary amine, quaternary amine or phosphonium catalyst and biphasic polymerization monomer depicting the relationship between catalyst concentration and polymer molecular weight by performing only a few representative polymerization reactions. Thus, the entire relationship between catalyst concentration and final polymer molecular weight for a given catalyst and a given monomer can be readily determined by one of ordinary skill in the art without undue experimentation.

Thus, as shown in the accompanying drawing figure, when the molar ratio of triethylamine to DTE is about 2.1:1.0, the final weight-average molecular weight for poly (DTE carbonate) is about 180 K daltons. When the molar ratio is about 0.9:1.0, the molecular weight is about 105 K daltons. When the molar ratio is about 0.3:1.0, the molecular weight is about 50 K daltons.

Accordingly, strict control of reaction mixture pH not only prevents hydrolytic degradation of pH-sensitive monomers, it can also be used to determine the final molecular weight of such monomers when the biphasic polymerization catalyst is a tertiary or a quaternary amine or a phosphonium compound. The use of tertiary or quaternary amine or phosphonium compound catalysts and strict pH control can also be used to determine the final molecular weight of polymers prepared from hydrolytically stable monomers that are not pH-sensitive as well.

Hydrolytically stable monomers include diphenols used in the preparation of polycarbonates, including, but not limited to, Bisphenol A, hydroquinone, dihydroxybenzophenone, dihydroxyphenylsulfide, dihydroxyphenylsulfone, Bisphenol F, and the like.

Hydrolytically unstable monomers include, but are not limited to, the amino acid-derived diphenols disclosed in the aforementioned U.S. Pat. No. 5,099,060. Such hydrolytically unstable diphenols have the structure of Formula I:

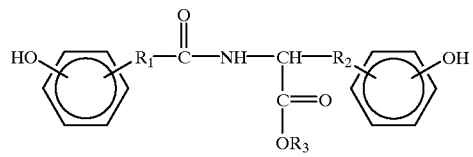

wherein $R_1$ and $R_2$ are independently selected from —CH=CH— and (—CH$_2$—), wherein n is between zero and six, inclusive, and $R_3$ is selected from allyl and alkylaryl groups containing up to 18 carbon atoms and biologically and pharmaceutically active agents. $R_1$ and $R_2$ are preferably (—CH$_2$—)$_n$, wherein n is independently one or two. When $R_3$ is an alkyl or alkylaryl group, it is preferably selected from ethyl and benzyl groups. Most preferably, $R_1$ is —CH$_2$—CH$_2$ and $R_2$ is —CH$_2$—. These most preferred compounds are tyrosine dipeptide analogues known as desminotyrosyl tyrosine alkyl or allylaryl esters. Desaminotyrosine occurs naturally in plants. Desaminotyrosine is also a metabolic end-product of tyrosine, produced by *Clostridium sporogenes*, a normal m of the human intestinal flora. In this preferred group, the diphenols can be regarded as derivatives of tyrosyl-tyrosine dipeptides from which the N-terminal amino group has been removed. The ethyl ester diphenol is most preferred. Mixtures of diphenols can also be used, for example, a mixture of the ethyl and benzyl esters of desaminotyrosyl tyrosine may be employed. Methods for preparing the preferred hydrolytically unstable diphenol monomers are disclosed in U.S. Pat. No. 5,587,507 and in copending U.S. patent application Ser. No. 08/625, 763 filed Mar. 29, 1996, the disclosures of both of which are hereby incorporated by reference.

The acid-forming co-monomers reacted with the first monomers in the reactions of the present invention are also readily identifiable by those of ordinary skill in the art without undue experimentation. When the first monomer is a diphenol, the acid-forming co-monomer is typically a dihalide selected from:

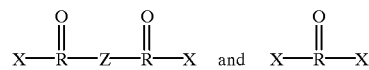

wherein X is halogen, R is carbon or sulfur and Z is an alkyl, aryl, alkylaryl, alkyl ether, aryl ether or alkylaryl ether group containing up to 18 carbon atoms. Preferred dihalides include phosgene (also known as carbonyl dichloride), diphosgene, triphosgene, adipoyl chloride, sebacoyl chloride, and the like. As noted above, when the first monomer is a diphenol and the dihalide is phosgene, the resulting polymer is a polycarbonate.

While reference is made to the polymerization of polycarbonates from diphenols and phosgene, the present invention is applicable to essentially any biphasic polymeriation process, regardless of whether the monomers employed are hydrolytically unstable or hydroltically stable. Accordingly, the methods of the present invention can not only be used in the preparation of polycarbonates, they can also be used in the preparation of polythiocarbonates, polyimin nates, poly (carboxylic acid esters), poly(thiol esters), poly(arylates), poly(ester sulfonates), poly(ester anhydrides), copoly(ester carbonates) and poly(ether carbonates) and the like.

With respect to polycarbonates, the polymerization process of the present invention is otherwise essentially conventional and employs the teachings of Schnell, Chemistry and Pysics of Polycarbonates, (Interscience, New York 1964) and Millich and Carraher, Interfacial Synthesis, (Marcel Dekker, New York, 1977). The disclosure of these texts is incorporated herein by reference thereto.

As noted above, when tertiary and quaternary anine or phosphonium compound catalysts are employed within a pH range between about sLx and about eight, polycarbonates and other polymers having predetermined molecular weights may be polymerized without the use of end-capping reagents. Nevertheless, such end-capping reagents may be employed, if such terminal groups are deemed critical for polymer property control, i.e., thermal stability, etc. Furthermore, end-capping reagents may be employed for the preparation of end-functionalized polymers for further derivatization. Thus, end-capping reagents may be employed having the structure:

When end-caping is being employed for polymer property control, E represents essentially any non-reactive moiety conventionally used in biphasic polymerization reactions for polymer end-capping, and is typically an alkyl, alkylaryl or aryl group containing up to 18 carbon atoms. Preferred end-capping reagents include the paaabens (hydroxyezic acid esters), and most preferably ethyl 4-hydroxybenzate.

When end-capping is being performed to end-functionalize polymers for further derivatization, then E represents a biphasicly non-reactive moiety that may be reacted post-polymerization to derivatize the polymer, typically substituted allyl, allylaryl and aryl groups, such as hydroxybenzoic acid esters, acryloyl chloride and methacryloyl chloride.

Alternative methods in accordance with the present invention take advantage of the basicity of typical catalysts, including the tertiary and quaternary amine catalysts, and utilize these materials in the inventive method as acid scavengers in combination with the aforementioned alai-metal alkoxides and other conventional organic or inorganic bases. The alternative methods pre-blend the catalyst with the aforementioned acid scavenger, which pre-blended mixture is then added to the reaction mixture at an addition rate relative to the addition rate of the acid-forming co-monomer effective to maintain the pH of the reaction mixture between about six and about eight.

End-capping reagents may be used to determine final polymer molecular weight in accordance with the present invention when tertiary and quaternary amine and phosphonium catalysts are being employed. However, the ability to control final polymer molecular weight, and at the same time provide derivable end-functionalized polymers, represents a significant advance in the field of polymer blend technology, making possible the preparation of compatibilizers to increase the adhesion between, for example, two incompatible or partially compatible systems. For example, A-B or A-B-A type di- or tri-block compatibilizers can be readily prepared that currently cannot be synthesized by conventional biphasic or sequential polymerization processes.

Molecular weight control is important in determining the final application of a polymer system. Many polymer properties exhibit significant dependence on molecular weight, and selected optimum properties are reached at specific molecular weights. For example, mechanical properties and behavior are greatly influenced by the molecular weight and aid in determining the usefulness in a particular application. The ability to tailer molecular weight is a powerfull tool, and new techniques and methods are constantly sought. This is particularly true for monomeric systems which are hydrolytically labile, such that reaction conditions need to be devised to ensure that the base structure, or repeating unit, remains intact while allowing the polymerization to occur.

It is generally preferred for the molar ratio of acid-forming co-monomer to first monomer to be about 1.4:1 or greater to obtain polymers of molecular weight sufficiently great to provide mechanical properties suitable for many applications.

The minimum quantity of phosgene ($COCl_2$ required is that to 1) achieve either a leveling peak molecular weight (for molecular weight control using an initial TEA concentration), or 2) a maximum molecular weight as prescribed by the addition of a chain capping reagent—e.g. ethyl 4-hydroxybenzoate ("EP")—at an experimental extent of reaction (p).

In the latter case, for determination of the amount of EP necessary for a given molecular weight, the stoichiometric imbalance (r) must be calculated, a typical polydispersity (Mw/Mn) assumed, and the extent of reaction (p) estimated. Experimentally, the polydispersity and extent of reaction are relatively consistent for a given set of conditions.

Empirically, it has been determined that:

$$M_n/FW_{RU}=X_n=(1+r)/(1+r-2rp) \tag{1}$$

and reduces to:

$$X_n=(1+r)/(1-r) \text{ when } p=1.000, \tag{2}$$

where:

$M_n$=number average molecular weight,
$FW_{RU}$=formula weight the polymeric repeat unit,
$X_n$=number average degree of polymerization,
r=stoichiometric imbalance=$N_a/(N_a+2N_b)$,
$N_a$=moles of bifunctional reagent,
$N_b$=moles of monofunctional reagent, and
p=extent of reaction.

Generally, achievement of p=1.000 is not commercially feasible from a time perspective. However, it is clear that to obtain a given molecular weight, a minimum extent of reaction must be obtained.

Regardless of whether or not end-capping is employed, polymer isolation and purification is obtained by the method of the present invention in one of several ways. Typically, the biphasic reaction mixture is subjected to reduced pressure to effect organic solvent removal, resulting in a water precipitated polymer obtained as a white, extremely strong coherent material, with isolated yields typically greater than 95 percent. Alternatively, the biphasic reaction mixture can be phased to remove the aqueous layer, and the organic layer may be washed with several portions of water with subsequent phasing to effect salt removal. Coagulation in 2-propanol, preferably in four to twelve, and preferably eight parts alcohol per one part organic solvent, followed by air, heat and/or vacuum drying, results in isolation of a white, free-flowing product in typical isolation yields of 80–95 percent.

The polymers obtained form resins which can be worked-up by known methods commonly employed in the field of synthetic resins to produce a large variety of different articles with valuable physical and chemical properties. The diphenols of U.S. Pat. No. 5,099,060 and related patents provide polymers capable of being hydrolyzed into non-toxic degradation products that can be used in medical applications. Articles made of such polymers are useful inter alia, as biomedical prostheses and implants. Degradable polymers prepared by the methods of the present invention can also be used as matrix polymers in controlled drug delivery systems in which a biologically or pharmacologically active agent is physically embedded or dispersed in the polymer matrix or otherwise physically admixed with the polymer. Suitable biologically or pharmacologically active agents include in principle any active agent that has to be repeatedly administered over prolonged periods of time. The biologically or pharmacologically active agent may also be covalently attached to the first monomer prior to polymerization and may represent the need for the biphasic polymerization to occur at a pH between about six and about eight. Thus, $R_3$ of Formula I may also be a biologically or pharmacologically active agent.

The following non-limiting examples set forth hereinbelow illustrate certain aspects of the invention. All parts and percentages are by weight, unless otherwise noted, and all temperatures are in degrees Celsius. Desaminotyrosyltyrosine ethyl ester (DTE) and desaminotyrosyl tyrosine benzyl ester (DT Benzyl) were prepared using the method disclosed by U.S. Pat. No. 5,587,507, the disclosure of which is incorporated herein by reference. Methylene chloride and sodium hydroxide were obtained from Fisher Scientific. Triethylamine was obtained from Aldrich Chemical Co., Inc. Phosgene was obtained from Matheson Gas Products. All solvents were HPLC grade. All other reagents were of analytical grade and were used as received.

Molecular weights were determined by gel permeation chromatography (GPC) on a chromatographic system consisting of a Perkin-Elmer Model 410 pump, a Waters Model 410 Refractive Index Detector and a Perlin-Elmer Model 2600 computerized data station. Two STYRAGEL GPC columns ($10^5$ and $10^3$ Angstrom pore size) were operated in series at a flow rate of 1 mL/min with tetrahydrofiran (THF) as the eluent. Polymer solutions (7 mg/mL) were prepared, filtered (0.45 micron membrane filter) and allowed to equilibrate for 30 minutes prior to injection. The injection volume was 20 microliters. Molecular weights were calculated relative to polystyrene standards (Polymer Laboratories, Inc.) without further corrections.

EXAMPLES

Example 1

A 1L 3 neck Morton flask was equipped with an overhead stirrer with a gas tight bearing, pH probe, and two "Y" adapters to which were attached a caustic addition funnel, internal thermometer, Teflon tube subsurface gas feed, and a gas outlet connected to a caustic/triethylamine scrubber. Three grams of DTE monomer, 30 mL of methylene chloride, and 10 mL of water were charged to the reactor, cooled to 0° C., and 1.80 grams of triethylamine added. The temperature was maintained between 0–5° C., and the rate of phosgene gas and 1 N sodium hydroxide addition were balanced to maintain the pH between 6–8. The resulting polymer was recovered by precipitation and filtration and washed with water, and molecular weights were determined as described above, with $M_w$=173,700 daltons and $M_n$=114,712 daltons.

Example 2

Three grams of DTE monomer, 30 nL of methylene chloride, and 10 mL of water were charged to the reactor and cooled to 0° C. substantially as in Example 1 with the exception that a 250 ml flask was used. Triethylamine in the amount of 0.73 grams was added. The temperature was maintained between 0–5° C., and the rate of phosgene gas and 1 N sodium hydroxide addition was balanced to maintain the pH between 6–8. The resulting polymer was recovered as in Example 1 and the molecular weight was determined, with $M_w$=107,302 daltons, and $M_n$=59,460 daltons.

Example 3

Three grams of DTE monomer, 30 nL of methylene chloride, and 10 mL of water were charged to the reactor and cooled to 0° C. substantially as in Example 1, with the exception that a 250 ml flask was used. Triethylamine in the amount of 0.22 grams was added. The temperature was maintained between 0–5° C., and the rate of phosgene gas and 1 N sodium hydroxide addition was balanced to maintain the pH between 6–8. The resulting polymer was recovered as in Example 1, and the molecular weight was determined, with $M_w$=46,311 daltons and $M_n$=28,715 daltons.

Example 4

Ten grams of DTE monomer, 100 nL of methylene chloride, and 50 mL of water were charged to the reactor and cooled to 0° C. substantially as in Example 1, and 0.04 grams of triethylamine was added. The temperature was maintained between 0–5° C., and the rate of phosgene gas and 1 N sodium hydroxide addition were balanced to maintain the pH between 6–8. The resulting polymer was recovered as in Example 1, and the molecular weight was determined, with $M_w$=4,503 daltons and $M_n$=1,666 daltons.

Example 5

Ten grams of DTE monomer, 80 mL of methylene chloride, and 15 mL of water are charged to the reactor and cooled to 0° C. substantially as in Example 1. 2.8 g of triethylamine was added, and the temperature was maintained between 0–5° C. The rate of addition of phosgene gas and a blend of 1 N sodium hydroxide and 0.1 N triethylamine was balanced to maintain a pH between 6–8. The resulting polymer was recovered as in Example 1 and the molecular weight was determined, with $M_w$=353,922 daltons and $M_n$=188,731 daltons.

Example 6

35 grams of DTE monomer, 0.1025 grams of ethyl 4-hydroxybenzoate, 300 mL of methylene chloride, and 50 mL of water were charged to the reactor and cooled to 0° C. substantially as in Example 1. 9.9 g of triethylamine was added, and the temperature was maintained between 0–5° C. The rate of addition of phosgene gas and a blend of 1.0 N sodium hydroxide and 0.1 N trimethylamine was balanced to maintain a pH between 6–8. The resulting polymer was recovered as in Example 1 and the molecular weight was determined, with $M_w$=55,217 daltons and $M_n$=34,237 daltons.

Example 7

70.5 grams of DTBenzyl monomer, 60.0 grams of DTE monomer, 0.123 grams of ethyl 4-hydroxybenzoate, 1300 mL of methylene chloride, and 200 mL of water were charged to the reactor and cooled to 0° C. substantially, as in Example 1. Then, 34.0 grams of triethylamine was added. The temperature was maintained between 0–5° C., and the rate of addition of phosgene gas and a blend of 1.0 N sodium hydroxide and 0.1 N triethylanine was balanced to maintain a pH between 6–8. The resulting polymer was recovered as in Example 1. The molecular weights, as determined by gel permeation chromatography, were $M_w$=88,622 daltons and $M_n$=49,788 daltons.

Example 8

30.0 grams of DTBenyl monomer, 0.016 grams of ethyl 4-hydroxybenzoate, 300 mL of methylene chloride, and 50 mL of water were charged to the reactor and cooled to 0° C., substantially as in Example 1, with the exception that a 5 L flask was used. Then, 7.3 grams of triethylamine was added. The temperature was maintained between 0–5° C., and the rate of addition of phosgene gas and a blend of 1.0 N sodium hydroxide and 0.1 N triethylamine was balanced to maintain a pH between 6–8. The resulting polymer was recovered as in Example 1. The molecular weights, as determined by gel permeation chromatography, were $M_w$=127,266 daltons and $M_n$=75,596 daltons.

Example 9

3.0 grams of DTE monomer, 15 nmL of methylene chloride, and 10 mL of water were charged to a 50 mL reactor and cooled, substantially as in Example 1, with the exception that a 250 ml flask was used. Triethylamine in the amount of 0.9 grams was added, and the temperature was maintained between 0–5° C. One gram of sebacoyl chloride (i.e., an equimolar amount relative to DTE) was added, and the mixture stirred for an additional 30 minutes. The resulting polymer was recovered as in Example 1, with $M_w$=182,636 daltons and $M_n$=110,717 daltons, determined by gel permeation chromatography.

COMPARATIVE EXAMPLE

Five grams of DTE monomer, 50 mL of methylene chloride, and 15 mL of water were charged to the reactor as in Example 1 and cooled to 0° C., substantially as in Example 1, with the exception that a 250 ml flask was used. No catalyst was employed. The temperature was maintained between 0–5° C., and the rate of phosgene gas and 1 N sodium hydroxide addition was balanced to maintain a pH between 6–8. The resulting polymer was recovered as in Example 1 and the molecular weight was determined, with $M_w$=3,688 daltons and $M_n$=2,405 daltons. From the foregoing examples, the relationship at pH 6–8 between weight-average and number-average molecular weight and the amount of phase transfer catalyst employed is readily apparent, with molecular weight increasing as the amount of phase-transfer catalyst increases. From the foregoing results the end-product molecular weight for a given quantity of phase transfer catalyst can be readily predicted.

Differential scanning calorimetry (DSC) of biphasicly prepared polymers revealed glass transition temperatures ($T_g$'s) in the range of 80–91° C. This range is comparable to the poly(DTE carbonates) disclosed in U.S. Pat. No. 5,099,060. Thermal analysis was performed with a TA Instruments 910 Differential Scanning Calorimeter calibrated with indium. An 8.7 mg sample was subjected to a double run at a heating rate of 10° C./min. over a 175° C. range.

Reaction of the polymers of Examples 1–7 with diazomethane demonstrated that hydrolysis of the ethyl ester substituent did not occur during the biphasic polymerizaton at pH 6–8. The hydrolysis would have yielded free carboxylic acid, a moiety towards which diazomethane is a highly specific reagent for formation of methyl esters. By reacting the polymers with diazomethane, the extent of hydrolysis may be quantitatively determined by proton nuclear magnetic resonance ($^1$H NMR) spectroscopy of the resulting methyl groups. The presence of methyl ester is manifested by the appearance of a singlet at 3.7 parts per million (ppm), which can be integrated against other known resonances within the system. The polymers of Examples 1–7, when reacted with diazomethane and analyzed by $^1$H NMR, showed absolutely no methyl ester at 3.7 ppm, thus precluding hydrolysis of the ethyl ester substituent under the pH 6–8 polymerization conditions.

Thus, triethylame (TEA) has been demonstrated to be an extremely effective catalyst for the biphasic polymerization of DTE. Final polymeric molecular weight was also found to be readily controlled on a laboratory scale by control of the catalyst concentration. The TEA/DTE molar ratio has been shown to have a dramatic effect on the final molecular weight, with a linear correlation of increasing molecular weight with higher TEA/DTE ratios. Additionally, the polydispersities of poly(DTE carbonates) prepared using TEA as the catalyst range from about 1.5 to about 1.8.

The TEA/DTE ratio also correlates to the maximum molecular weights achievable. As shown in the sole drawing Figure, polymerizations were run at four selected ratios of TEA to DTE, wherein for each TEA/DTE ratio, the ratio of phosgene to DTE was progressively increased. The maximum molecular weight was obtained at approximately a 3 molar excess of phosgene, with no dramatic increase in molecular weight with additional phosgene. The increase in molecular weight with increasing levels of catalyst is also evident from this Figure.

The present invention thus provides a method for preparing polymers of any desired molecular weight without the need for end-capping. Therefore, if it is determined that end-Wapping is deemed critical for property stability (i.e., thermal), then capping can still be applied in conjunction with the higher TEA/DTE ratios. It is believed that the necessity for an excess of phosgene may be based upon competition between phosgene hydrolysis and monomer/polymer reactivity, which may be a function of the mixing efficiency and speed.

The following Examples 10 through 18 exemplify molecular weight control using a chapping reagent for the polymerzation of desaaanotyrosy tyrosine (ethyl ester) (DTE), desam otyrosyl tyrosine(benzyl ester) (DTBzl), and mixtures thereof.

Example 10

To a 1L reaction vessel equipped with overhead stirrer, gaseous subsurface feed tube, metered solution addition, pH probe, temperature probe and caustic scrubber, charged 35.0 g DTE, 0.05 g of ethyl 4-hydroxbenzoate (EP), 0.25 L of methylene chloride, and 0.05 L of water. Cooled to 5° C., and added 10.0 g of triethylamine (TEA). Simultaneous controlled addition of phosgene and a solution of 1M NaOH/0.1M TEA added at between 5–10° C. reaction temperature, between a maintained pH 7–8 until a 2.0 molar excess of phosgene to DTE was achieved. The resulting polymer was recovered by precipitation into 2-propanol and filtration. The isolated polymer had a molecular weight profile of Mw=103,089 and Mn=62,500, with a yield of 30.5 g.

Example 11

To a 5L reaction vessel equipped with overhead stirrer, gaseous subsurface feed tube, metered solution addition, pH probe, temperature probe and caustic scrubber, charged 200.0 g DTE, 0.088 g EP, 1.75 L methylene chloride, and 0.30 L of water. Cooled to 5° C., and added 56.7 g of triethylaaine (TEA). Simultaneous controlled addition of phosgene and a solution of 1M NaOH/0.1M TEA added at between 5–10° C. reaction temperature, between a maintained pH 8–9 until a 1.4 molar excess of phosgene to DTE was achieved. At prescribed times, four×4.0 g and five×7.6 g of TEA was added prior to the finish of the phosgene addition. The resulting polymer was recovered by precipitation into 2-propanol and filtration. The isolated polymer had a molecular weight profile of Mw=160,376 and Mn=88,438, with a yield of 182.0 g.

Example 12

To a 5L reaction veaael equipped with overhead stirrer, gaseous subsurface feed tube, metered solution addition, pH probe, temperature probe and caustic scrubber, charged 250.0 g DTE, 0.136 g EP, 2.0 L methylene chloride, and 0.25 L of water. Cooled to 5° C., and added 70.8 g of triethylamine (TEA). Simultaneous controlled addition of phosgene and a solution of 1M NaOH/0.1M TEA added at between 5–10° C. reaction temperature, at a maintained pH 8 until a 1.6 molar excess of phosgene to DTE was achieved. The resulting polymer was recovered by precipitation into 2-propanol and filtration. The isolated polymer had a molecular weight profile of Mw=198,396 and Mn=104,877, with a yield of 227.0 g.

Example 13

To a 5L reaction vessel equipped with overhead stirrer, gaseous subsurface feed tube, metered solution addition, pH probe, temperature probe and caustic scrubber, charged 250.0 g DTE, 0.547 g EP, 2.0 L methylene chloride, and 0.25 L of water. Cooled to 5° C., and added 70.8 g of triethylanine (TEA). Simultaneous controlled addition of phosgene and a solution of 1MNaOH/0.1M TEA added at between 5–10° C. reaction temperature, at a maintained pH 8 until a 1.6 molar excess of phosgene to DTE was achieved. The resulting polymer was recovered by precipitation into 2-propanol and filtration. The isolated polymer had a molecular weight profile of Mw=101,088 and Mn=58,187, with a yield of 216. g.

Example 14

To a 5L reaction vessel equipped with overhead stirrer, gaseous subsurface feed tube, metered solution addition, pH probe, temperature probe and caustic scrubber, charged 588.0 g DTE, 0.994 g EP, 2.2 L methylene chloride, and 0.25 L of water. Cooled to 5° C., and added 170.1 g of triethylamine (TEA). Simultaneous controlled addition of phosgene and a solution of 3M NaOH/0.04M TEA added at between 5–10° C. reaction temperature, at a maintained pH 8 until a 1.4 molar excess of phosgene to DTE was achieved. The resulting polymer was recovered by precipitation into 2-propanol and filtration. The isolated polymer had a molecular weight profile of Mw=91,185 and Mn=45,034, with a yield of 562.8 g.

Example 15

To a 5L reaction vessel equipped with overhead stirrer, gaseous subsurface feed tube, metered solution addition, pH probe, temperature probe and caustic scrubber, charged 590.0 g DTE, 0.126 g EP, 2.2 L methylene chloride, and 0.25 L of water. Cooled to 5° C., and added 167.1 g of triethylamine (TEA). Simultaneous controlled addition of phosgene and a solution of 3M NaOH/0.04M TEA added at between 5–10° C. reaction temperature, at a maintained pH 8 until a 1.4 molar excess of phosgene to DTE was achieved. The resulting polymer was recovered by precipitation into 2-propanol and filtration. The isolated polymer had a molecular weight profile of Mw=181,529 and Mn=72,768, with a yield of 595.6 g.

Example 16

To a 1L reaction vessel equipped with overhead stirrer, gaseous subsurface feed tube, metered solution addition, pH probe, temperature probe and caustic scrubber, charged 35.0 g DTE, 0.1025 g EP, 0.30 L methylene chloride, and 0.05 L of water. Cooled to 5° C., and added 10.0 g of triethylamine (TEA). Simultaneous controlled addition of phosgene and a solution of 1M NaOH/0.1M TEA added at between 5–10° C. reaction temperature, at a maintained pH 7 until a 2.2 molar excess of phosgene to DTE was achieved. The resulting polymer was recovered by precipitation into 2-propanol and filtration. The isolated polymer had a molecular weight profile of Mw–55,217 and Mn–34,237, with a yield of 30.5 g.

Example 17

To a 1L reaction vessel equipped with overhead stirrer, gaseous subsurface feed tube, metered solution addition, pH probe, temperature probe and caustic scrubber, charged 35.0 g DTE, 0.062 g EP, 0.25 L mettylene chloride, and 0.05 L of water. Cooled to 5° C., and added 10.0 g of triethylamine (TEA). Simultaneous controlled addition of phosgene and a solution of 1M NaOH/0.1M TEA added at between 5–10° C. reaction temperature, at a maintained pH 7 until a 4.9 molar excess of phosgene to DTE was achieved. The resulting polymer was recovered by precipitation into 2-propanol and filtration. The isolated polymer had a molecular weight profile of Mw=59,013 and Mn=33,356, with a yield of 29.6 g.

Example 18

To a 5L reaction vessel equipped with overhead stirrer, gaseous subsurface feed tube, metered solution addition, pH probe, temperature probe and caustic scrubber, charged 100.0 g DTE, 0.1423 g EP, 0.75 L methylene chloride, and 0.15 L of water. Cooled to 5° C., and added 28.7 g of triethylamine (TEA). Simultaneous controlled addition of phosgene and a solution of 1M NaOH/0.1M TEA added at between 5–10° C. reaction temperature, at a maintained pH 7 until a 3.0 molar excess of phosgene to DTE was achieved.

At a prescribed time, 10.0 g of TEA was added prior to the finish of the phosgene addition. The resulting polymer was recovered by precipitation into 2-propanol and filtration. The isolated polymer had a molecular weight profile of Mw=88,373 and Mn=48,401, with a yield of 85.2 g.

Table 1 summarizes examples of molecular weight control using pH 6–8 and initial TEA concentration at specified biphasic solution concentrations

TABLE 1

| Example No. | $M_w \times 10^4$ | TEA/DTE Ratio | DTE Initial Concentration in $MeCl_2$ | Initial $MeCl_2/H_2O$ Ratio |
|---|---|---|---|---|
| Comparative Example | 0.37 | 0.00 (No TEA) | 10% | 3.3 |
| 4 | 0.45 | 0.01 | 10% | 2.0 |
| 3 | 4.6 | 0.26 | 10% | 3.0 |
| 2 | 10.7 | 0.85 | 10% | 3.0 |
| 1 | 17.4 | 2.13 | 10% | 3.0 |
| 9 | 18.3 | 1.06 | 20% | 1.9 |
| 5 | 35.4 | 0.99 | 12.5% | 5.3 |

Table 2 summarizes examples of molecular weight control with a capping reagent at a specific pH.

TABLE 2

| Example No. | $M_w \times 10^3$ | Experimental Extent of Reaction | mg EP/g Polymer | pH | Molar Excess of $COCl_2$/DTE |
|---|---|---|---|---|---|
| 16 | 55.2 | 0.9950 | 2.7 | 7 | 2.2 |
| 17 | 59.0 | 0.9920 | 1.7 | 7 | 4.9 |
| 18 | 88.4 | 0.9947 | 1.3 | 7 | 3.0 |
| 14 | 91.2 | 0.9950 | 1.6 | 8 | 1.4 |
| 13 | 101.1 | 0.9981 | 2.0 | 8 | 1.6 |
| 10 | 103.1 | 0.9970 | 1.3 | 7–8 | 2.0 |
| 11 | 160.4 | 0.9966 | 0.4 | 8–9 | 1.9 |
| 15 | 181.5 | 0.9952 | 0.2 | 8 | 1.4 |
| 12 | 198.4 | 0.9975 | 0.5 | 8 | 1.6 |

Table 3 lists weight-average molecular weight versus phosgene molar excess to monomer substantially under the conditions of Example 11.

TABLE 3

| $M_w \times 10^4$ | Phosgene molar excess to DTE monomer |
|---|---|
| 5.0 | 1.20 |
| 6.8 | 1.31 |
| 7.7 | 1.34 |
| 8.0 | 1.46 |
| 10.2 | 1.59 |
| 13.2 | 1.78 |
| 13.9 | 1.85 |
| 16.0 | 1.92 |

Table 4 lists weight-average molecular weight versus phosgene molar excess to monomer substantially under conditions of Example 10.

TABLE 4

| $M_w \times 10^4$ | Phosgene molar excess to DTE monomer |
|---|---|
| 0.3 | 0.95 |
| 0.6 | 1.18 |
| 1.6 | 1.46 |
| 6.5 | 1.74 |
| 10.3 | 2.02 |

Table 5 lists weight-average molecular weight versus phosgene molar excess to monomer substantially under conditions of Example 14.

TABLE 5

| $M_w \times 10^2$ | Phosgene molar excess to DTE monomer |
|---|---|
| 5.6 | 1.24 |
| 8.8 | 1.39 |
| 9.1 | 1.43 |

The foregoing examples and description of the preferred embodiment should be taken as illustrating, rather than as limiting, the present invention as defined by the claims. As will be appreciated, numerous variations and combinations of the features set forth within the foregoing description and examples can be utilized without departing from the present invention.

What is claimed is:

1. In a biphasic polymerization process for providing an amino acid derived polymer, comprising the steps of:
    admixing an aqueous solution comprising a first monomer with a water-immiscible organic solvent;
    adding to the admixture a catalyst selected from the group consisting of tertiary amine, quaternary amine and phosphonium catalysts, an acid-forming co-monomer for said first monomer and an acid scavenger; and
    recovering the resulting amino acid derived polymer, the improvement comprising:
    providing said aqueous solution at a pH from about six to about eight, and
    adding to said admixture said acid-forming co-monomer and said acid scavenger at relative rates effective to maintain said pH of said admixture in a range from about six to about eight, to thereby prevent said first monomer from hydrolyzing to form an acid prior to polymerization, wherein said resulting amino acid derived polymer is hydrolytically unstable at physiological conditions.

2. The process of claim 1, wherein said water-immiscible organic solvent is selected from the group consisting of methylene chloride, chloroform and 1,2-dichloroethane.

3. The process of claim 1, wherein said catalyst is a phase transfer catalyst.

4. The process of claim 1, wherein said catalyst is a tertiary or quaternary amine compound selected from the group consisting of triethylamine, benzyltriethylammonium chloride, methyl $C_8$–$C_{10}$ trialkyl ammonium chlorides and tetrabutyl ammonium iodide.

5. The process of claim 1, wherein said catalyst is present in a molar ratio to said first monomer effective to provide a predetermined weight-average or number-average molecular weight for said resulting polymer.

6. The process of claim 1, wherein said acid scavenger is selected from the group consisting of alkali metal hydroxides, alkaline earth metal hydroxides, alkali metal carbonates, alkaline earth metal carbonates, alkali metal bicarbonates and alkaline earth metal bicarbonates.

7. The process of claim 6, wherein said acid scavenger is sodium hydroxide.

8. The process of claim 1, wherein said addition rate of said co-monomer and said addition rate of said acid scavenger are effective to maintain said pH of said admixture at about seven.

9. The process of claim 1, wherein said catalyst and said acid scavenger are blended together and added to said admixture at an addition rate relative to said addition rate of said co-monomer effective to maintain said pH of said admixture from about six to about eight.

10. The process of claim 1, wherein said first monomer is a diphenol and said co-monomer is a dihalide selected from the group consisting of:

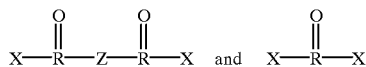

wherein X is a halogen, R is carbon or sulfur, and Z is an aryl, alkyl, alkylaryl, alkyl ether, aryl ether or alkylaryl ether group containing up to 18 carbon atoms.

11. The process of claim 10, wherein said dihalide is selected from the group consisting of phosgene, diphosgene, triphosgene, adipoyl chloride and sebacoyl chloride.

12. The process of claim 11, wherein said dihalide is phosgene.

13. The process of claim 10, wherein said diphenol has the structure:

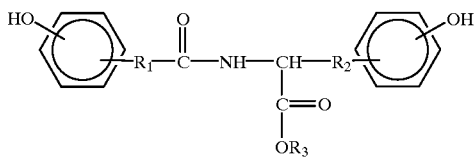

wherein $R_1$ and $R_2$ are independently selected from the group consisting of —CH=CH— and (—CH$_2$—)$_n$, wherein n is between 0 and 6, inclusive, and $R_3$ is selected from the group consisting of alkyl and allylaryl groups containing up to 18 carbon atoms and biologically and pharmacologically active agents.

14. The process of claim 13, wherein $R_1$ and $R_2$ are (—CH$_2$—)$_n$, wherein n is independently 1 or 2 and $R_3$ is an ethyl or benyl group.

15. The process of claim 14, wherein $R_1$ is —CH$_2$—CH$_2$— and $R_2$ is —CH$_2$—.

16. The process of claim 15, wherein $R_3$ is an ethyl group.

17. The process of claim 14, wherein said diphenol is a first diphenol and said aqueous solution further comprises a second diphenol having the structure:

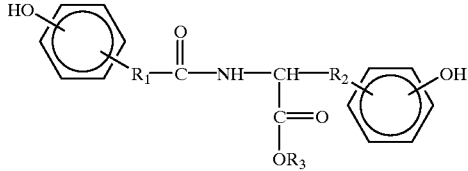

wherein $R_1$ and $R_2$ are (—CH$_2$—)$_n$, wherein n is independently 1 or 2 and $R_3$ is an ethyl or benzyl group.

18. The process of claim 17, wherein $R_1$ for both said first and second diphenols is —CH$_2$—CH$_2$—, $R_2$ for both said first and second diphenols is —CH$_2$—, $R_3$ for said first diphenol is an ethyl group and $R_3$ for said second diphenol is a benzyl group.

19. In a biphasic polymerization process for providing an amino acid derived polymer, comprising the steps of:
admixing an aqueous solution of a first monomer with a water immiscible organic solvent;
adding to the admixture a catalyst selected from the group consisting of tertiary amine, quaternary amine and phosphonium catalysts, an acid-forming co-monomer for said first monomer, and an acid scavenger; and
recovering the resulting amino acid derived polymer;
the improvement comprising:
providing said aqueous solution at a pH from about six to about eight,
adding said catalyst to said admixture at a molar ratio to said first monomer effective to provide a predetermined weight-average or number-average molecular weight for said resulting polymer, and
adding to said admixture said acid-forming co-monomer and said acid scavenger at relative rates effective to maintain the pH of said admixture in a range from about six to about eight, wherein said resulting amino acid derived polymer is hydrolytically unstable at physiological conditions.

20. The process of claim 19, wherein said water-immiscible organic solvent is selected from the group consisting of methylene chloride, chloroform and 1,2-dicholoroethane.

21. The process of claim 19, wherein said catalyst is a phase transfer catalyst.

22. The process of claim 21, wherein said catalyst is selected from the group consisting of triethylamine, benzyltriethylammonium chloride, methyl $C_8$–$C_{10}$ trialkyl amonium chlorides and tetrabutyl ammonium iodide.

23. The process of claim 19, wherein said acid scavenger is selected from the group consisting of alkali metal hydroxides, alkane earth metal hydroxides, alkali metal carbonates, alkle earth metal carbonates, alkali metal bicarbonates and alkaine earth metal bicarbonates.

24. The process of claim 23, wherein said acid scavenger is sodium hydroxide.

25. The process of claim 19, wherein said first monomer is a diphenol and said co-monomer is a dihalide selected from the group consisting of:

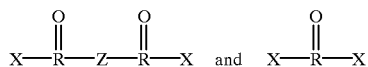

wherein X is a halogen, R is carbon or sulfur, and Z is an alkyl aryl, alkylaryl, alkyl ether, aryl ether or alkylaryl ether group containing up to 18 carbon atoms.

26. The process of claim 25, wherein said dihalide is selected from the group consisting of phosgene, diphosgene, triphosgene, adipoyl chloride and sebacoyl chloride.

27. The process of claim 26, wherein said dihalide is phosgene.

28. In a biphasic polymerization process for providing an amino acid derived polymer, comprising the steps of;
admixing an aqueous solution comprising a first monomer with a water-immiscible organic solvent;
adding to the admixture a catalyst selected from the group consisting of tertiary amine, quaternary amine and phosphonium catalysts, an acid-forming co-monomer for said first monomer and an acid scavenger; and recovering the resulting amino acid derived polymer, the improvement comprising:

providing said aqueous solution at a pH from about six to about eight, and adding to said admixture said acid-forming co-monomer and said acid scavenger at relative rates effective to maintain said pH of said admixture from about six to about eight, to thereby prevent said first monomer from hydrolyzing prior to polymerization, the molar ratio of acid-forming co-monomer to first monomer being 1.4:1 or greater, wherein said resulting amino acid derived polymer is hydrolytically unstable at physiological conditions.

29. The process of claim 28, wherein said water-immiscible organic solvent is selected from the group consisting of methylene chloride, chloroform and 1,2-dichloroethane.

30. The process of claim 28, wherein said catalyst is a phase transfer catalyst.

31. The process of claim 28, wherein said catalyst is a tertiary or quaternary amine compound selected from the group consisting of triethylamine, benzyltriethylanuonium chloride, methyl $C_8$–$C_{10}$ trialkyl ammonium chlorides and tetrabutyl ammonium iodide.

32. The process of claim 28, wherein said acid scavenger is selected from the group consisting of alkali metal hydroxides, alkaline earth metal hydroxides, alkali metal carbonates, alkaline earth metal carbonates, alkali metal bicarbonates and alkaline earth metal bicarbonates.

33. The process of claim 32, wherein said acid scavenger is sodium hydroxide.

34. The process of claim 28, wherein said addition rate of said co-monomer and said addition rate of said acid scavenger are effective to maintain said pH of said admixture at about seven.

35. The process of claim 28, wherein said catalyst and said acid scavenger are blended together and added to said admixture at an addition rate relative to said addition rate of said co-monomer effective to maintain said pH of said admixture from about six to about eight.

36. The process of claim 28, wherein said first monomer is a diphenol and said co-monomer is a dihalide selected from the group consisting of

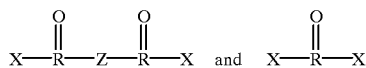

wherein X is a halogen, R is carbon or sulfur, and Z is an aryl, alkyl, alkylaryl, alkyl ether, aryl ether or alkylaryl ether group containing up to 18 carbon atoms.

37. The process of claim 36, wherein said dihalide is selected from the group consisting of phosgene, diphosgene, triphosgene, adipoyl chloride and sebacoyl chloride.

38. The process of claim 37, wherein said dihalide is phosgene.

39. The process of claim 36, wherein said diphenol has the structure:

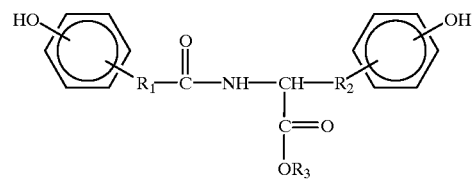

wherein $R_2$, and $R_2$ are independently selected from the group consisting of —CH=CH— and (—CH$_2$—)$_n$, wherein n is between 0 and 6, inclusive, and $R_3$ is selected from the group consisting of alkyl and alkylaryl groups containing up to 18 carbon atoms and biologically and pharmacologically active agents.

40. The process of claim 39, wherein $R_1$ and $R_2$ are (—CH$_2$—)$_n$, wherein n is independently 1 or 2 and $R_3$ is an ethyl or benzyl group.

41. The process of claim 40, wherein $R_1$ is —CH$_2$—CH$_2$— and $R_2$ is —CH$_2$—.

42. The process of claim 41, wherein $R_3$ is an ethyl group.

43. The process of claim 40, wherein said diphenol is a first diphenol and said aqueous solution further comprises a second diphenol having the structure:

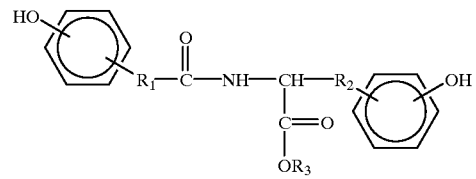

wherein $R_1$ and $R_2$ are (—CH$_2$—)$_n$, wherein n is independently 1 or 2 and $R_3$ is an ethyl or benzyl group.

44. The process of claim 43, wherein $R_1$ for both said first and second diphenols is —CH$_2$—CH$_2$—, $R_2$ for both said first and second diphenols is —CH$_2$—, $R_3$ for said first diphenol is an ethyl group and $R_3$ for said second diphenol is a benzyl group.

45. The process of claim 28 in which the molar ratio of acid-forming co-monomer to first monomer is less than about 3:1.

* * * * *